Patented Jan. 21, 1941

2,229,173

UNITED STATES PATENT OFFICE 2,229,173

PROCESS FOR PRODUCING VITAMINOUS SUBSTANCES

Kenneth C. D. Hickman, Rochester, N. Y., assignor to Distillation Products, Inc., Rochester, N. Y., a corporation of Delaware No Drawing. Application February 9, 1939, Serial No. 255,457

5 Claims. (Cl. 260—410)

This invention relates to an improved method for preparing vitamin substances and to new vitaminous products.

An object of the invention is to prepare esters of vitamin A in crystalline form. A further object is to provide a simplified procedure for preparing vitamin A and/or D esters in concentrated condition from relatively dilute source materials. A further object is to provide an improved method for preparing substantially pure esters of vitamine A. Other objects will appear from the following description and the appended claims.

These and other objects are accomplished in accordance with my invention which includes subjecting an oil which contains vitamins A and/or D in ester form to high vacuum, unobstructed path distillation, to obtain a vitamin ester concentrate, saponifying the concentrate thus prepared, separating the vitamin in alcohol form from the saponification mixture and esterifying the vitamin alcohol.

The oil which is employed in the first step of my invention, namely, the high vacuum distillation step, can be any oil or fraction thereof which contains vitamins A and/or D in ester form. Practically all natural fish oils contain these vitamin esters and are satisfactory as starting materials. I may likewise employ fractions of these materials, particularly vacuum distillation fractions which are insufficiently potent to be employed for medicinal purposes and are by-products in the ordinary distillation procedure for the preparation of medicinal concentrates. Examples of suitable oils are cod-liver, halibut-liver, tuna-liver, pollack-liver, sword fish liver, menhaden body, salmon body, etc., fish oils and fractions thereof.

The distillation is carried out under a high vacuum, i. e., a pressure below 1 mm. and preferably a pressure below .1 mm. Pressures in the neighborhood of .01 to .0001 mm. are generally used. The oil to be distilled is caused to flow in a thin film over a heated vaporizing surface by gravitational force or by centrifugal force. The temperature is preferably between about 100° and 275°. Vitamin A esters are usually obtained in highest concentration at about 170-250°. The vaporized vitamin molecules are condensed upon a condensing surface which is separated from the film by substantially unobstructed space. It is desirable that the film and the condensing surface be separated by a relatively short distance, such as a distance between ½ and 12 inches, and particularly distances of about 1-3 inches. When such distances are used the distillation is known as high vacuum, short path distillation. When the distance between the film and the condensing surface is less than the average distance which a vitamin molecule travels before colliding with a residual gas molecule, the distillation is known as molecular distillation. All of the above types of distillation can be employed and are to be understood as included within the meaning of the term, high vacuum, unobstructed path distillation.

The vitamin concentrate obtained as a distillate from the above described distillation procedure is then saponified. Saponification of vitamin containing oils in order to obtain a non-saponifiable fraction, which is a concentrated vitamin, is well known. Various modifications have been employed but the most general method is to treat the vitamin-containing oil with alcoholic sodium hydroxide or equivalent base and extract the saponification mixture with ether. This or any conventional method known in the art for saponification may be employed to saponify the concentrated vitamin distillate. The saponified vitamin is in alcohol form and is removed from the saponification mixture and obtained as a concentrate after vaporization of the solvent.

This vtiamin alcohol concentrate is then reacted with an esterifying agent. I prefer to employ acid halides for this purpose and to carry the reaction out in the presence of a base such as pyridine. It will be understood that other known esterifying agents, such as for instance acid anhydrides, may be employed. The esterifying agent may be derived from any acid, such as acetic, butyric, caproic, clupodonic, oleic, stearic, benzoic, and other aliphatic and aromatic acids. I prefer aliphatic acylating agents and I particularly prefer to employ acid halides of the highly unsaturated acids of fish oils having 3, 4, 5 and 6 double bonds. Esterification with such a mixture results in a vitamin ester which is believed to closely resemble the natural vitamin as it occurs in fish oils. Other mixed acylating agents comprising mixtures of the above acids or acids obtained by the saponification of various glyceride oils, such as linseed, corn, etc., oils, may be employed. The vitamin ester thus prepared and after elimination of the unreacted components of the esterification mixture is a highly potent substantially pure vitamin compound. Many of the esters are crystalline substances which further increases their value and interest.

Example 1

A good quality pollack-liver oil, having a vitamin A potency of 14,000 units per gram, was degassed at 90–100° C. at 100–10μ and passed over a still column heated to 170° C. when approximately 1% of the oil by weight was distilled and rejected. The oil now passed over a second still column heated to 232° C. and a cut of approximately 4% was collected. This had a vitamin A potency of 267,000 U. S. P. units per gram. The pressure in the first and second stills was approximately 1μ and the distilling gap was 1.5".

This fraction is hydrolyzed with aqueous caustic soda, containing a little alcohol and the non-saponifiable matter is extracted with ether. The ether extract is dried with sodium sulfate and then is allowed to react with an excess of acetyl chloride and pyridine in the cold. When the reaction is complete, the mixture is treated with aqueous hydrochloric acid to remove the excess pyridine, is washed with sodium carbonate, then with water, and is finally decanted and dried. The mixture is transferred to the molecular still, and should it prove too viscous for convenient handling, a quantity of high boiling fat is added. The vitamin compound and fat are subjected to distillation at temperatures ranging from 100° to 150° C. and the portion coming off at 130° is reserved as substantially pure vitamin A acetate. The vitamin A acetate may now be crystallized with a suitable solvent such as methyl alcohol, acetone, or ether, at a temperature of 0° or below.

Example II 125 grams of KOH were dissolved in 125 grams of water and made up to one liter with 95% alcohol. 550 grams of vitamin A ester concentrate produced by high vacuum distillation of a fish oil was dissolved in the solution and the resultant mixture kept at 50–60° C. for one hour with stirring. It was then cooled down, 4 liters of water was added and the soap mixture then extracted 3 times with moist ethyl ether. Three and one-half liters was used for the first time and one liter for each successive time. The ether extracts were combined and washed with water until the washings showed no pink color with phenol phthalein. The ether solution was then dried over night over anhydrous sodium sulphate in the ice box in an atmosphere of $CO_2$. The ether was removed under reduced pressure and the residue dissolved in methyl alcohol. On chilling, a good portion of the sterols was precipitated. This was filtered off, and the alcohol was removed under reduced pressure. The residue was dissolved in fish oil from which all the vitamin had been removed by molecular distillation. 5–10 cc. of an inert constant yield oil, substantially all of the components of which distills at about 120°, was also added.

The material was placed in a small cyclic molecular still and degassed and distilled, 6 cuts being taken from 105° to 240°, the pressure remaining from 2–4 μ. The fractions having a high content of vitamin A alcohol, 4 in number embracing the temperature range 110°–170°, having $E_{328}$ of 815–950, were recombined and redistilled. 15 grams collected between 130–150° at 1.5–2.5 μ. This 15 grams of vitamin A alcohol concentrate, containing 1,900,000 units per gram was added to 8 cc. of palmityl chloride and 3 cc. of pyridine. After 4 hours, 16 cc. of pyridine, 10 grams of palmityl chloride and 20 cc. of redistilled ether were added. After 22 hours the material was washed twice with 5% sodium carbonate and then washed with water until free of pyridine and soaps. The solution was dried over anhydrous sodium sulfate, filtered and the ether driven off. 27.5 grams of material was obtained having a potency of 950,000 units per gram. The material was subjected to molecular distillation by which means over 70 per cent of the vitamin (calculated from starting material) was recovered.

Example III

Crude shark liver oil is run rapidly through a molecular or pseudo molecular still and a fraction approximating 10 per cent is removed. This crude distillate is hydrolized, and after the non-saponifiable matter has been separated, as in the preceding example, it is taken into solution with a minimum of boiling methyl alcohol and is then chilled to below 0° C. This causes the sterols to be precipitated. The filtrate is concentrated in vacuo and the red, viscous fluid that results is treated with butyryl chloride. The resulting vitamin A butyrate is distilled as before. Shark liver oil contains alcohols other than vitamin A and a portion of these become esterified with the butyryl chloride. The final distillation is performed so as to eliminate the bulk of these inactive alcohol-esters.

Example IV 25.6 grams of vitamin A alcohol concentrate containing 2,700,000 units per gram and prepared as in Example 1 by distillation and saponification were dissolved in 50 cc. of redistilled ethyl ether. 40 grams of stearyl chloride, representing about 100 per cent excess was added; then 20 cc. of pyridine was added immediately with cooling. 50 cc. more ether was added, the solution was thoroughly shaken and the solution left at room temperature under nitrogen for two hours. The solution was poured into a separatory funnel and water and more ether were added. After thorough shaking and complete separation of the two layers, the water layer was drawn off. The ether layer was then extracted several times with water. It was then extracted continuously with 5% $Na_2CO_3$ solution and the soaps formed by this treatment carefully washed out with water. After washing several more times with carbonate solution the ether solution was washed until the washings gave no color with phenol-phthalein. The ether solution was then dried over anhydrous sodium sulfate, the ether was driven off and the remaining oil was distilled under molecular conditions. Over 75 per cent of the vitamin distilled at 185° or over and therefore the yield of stearate, based on the starting amount of alcohol was over 75 per cent.

Example V 14 grams of concentrate containing 2,000,000 units per gram and prepared as in Example 1 by distillation and saponification, 28 cc. of oleyl chloride and 15 cc. of pyridine were shaken together under nitrogen and then left at room temperature for 4 hours, at which time 15 cc. of ether, 12 cc. of oleyl chloride and 15 cc. of pyridine were added. After 22 hours of standing at room temperature the solution was shaken with two 150 cc. portions of 5% sodium carbonate, and then washed with water until the pyridine odor was faint. The ether layer was then dried over sodium sulfate, filtered and ether driven off. 26 grams of vitamin concentrate was obtained having a potency of 950,000 units per gram. Upon molecular distillation over 50% of the vitamin was obtained as the oleate.

Numerous modifications may be made in the above described procedure without departing from the spirit or scope of my invention. For instance, it is unnecessary to subject the synthetic vitamin ester to purification after the esterification treatment if the impurities present are not considered to be undesirable for the particular purpose in mind. Removal of the esterification catalyst and by-products is usually desirable. When further purification is desired, molecular distillation can be employed with advantage, although other purification treatments, such as solvent extraction, crystallization, etc., may be used. One such method of particular value for separating unreacted vitamin A alcohol from the vitamin ester is to wash with approximately 85% alcohol. The vitamin A alcohol is soluble in this mixture while the vitamin A ester is substantially insoluble. This procedure is of particular value in connection with the preparation of crystalline vitamin A acetate. The acetate distills at a temperature rather close to that at which vitamin A alcohol distills and although it is possible to separate them by distillation, it requires a plurality of distillations and it is more economical to employ the solvent extraction procedure. The elimination of impurities such as sterols from the vitamin alcohol concentrate is desirable, but not necessary.

My invention has the outstanding advantage that it provides crystalline vitamin esters which heretofore have never been prepared. It also eliminates many of the complicated, expensive and multitudinous steps heretofore necessary in the preparation of highly concentrated vitamins. The invention provides cheap, stable, crystalline, and highly potent vitamin substances.

This application is a continuation-in-part of my U. S. application No. 37,751, filed August 24, 1935, now Patent No. 2,205,925.

What I claim is:

1. The method of preparing a vitamin concentrate which comprises in combination subjecting an oil which contains the vitamin in ester form to high vacuum, unobstructed path distillation, separating a distillate containing a concentrate of the vitamin ester, saponifying the distillate, removing the vitamin alcohol from the saponification mixture and reacting it with an acid derivative to form a vitamin ester.

2. The method of preparing concentrated vitaminous substances which comprises subjecting an oil containing a vitamin in ester form to high vacuum, short path distillation, separating a distillate containing a concentrate of the vitamin ester, saponifying the ester, separating the vitamin alcohol from the saponification mixture, and esterifying the vitamin alcohol.

3. The process of preparing a vitamin product which comprises subjecting a fish oil to high vacuum, unobstructed path distillation, separating a distillate which contains the vitamin A content of the fish oil in concentrated form, subjecting this distillate to saponification, separating the vitamin A alcohol from the saponification mixture and esterifying it with a mixture of acid halides derived from the highly unsaturated acids of fish oils having 3, 4, 5 and 6 double bonds.

4. The process of preparing a vitamin A product which comprises subjecting a fish oil to high vacuum, short path distillation, separating a distillate containing vitamin A ester in concentrated form, subjecting the distillate to saponification, separating the vitamin A alcohol from the saponification mixture and esterifying the alcohol so obtained with an aliphatic acylating agent.

5. A method for preparing crystalline vitamin A acetate which comprises subjecting a fish oil to high vacuum unobstructed path distillation, separating a distillate containing concentrated vitamin A in ester form, saponifying the distillate, separating the vitamin A alcohol, treating it to remove sterols and other impurities, reacting the purified alcohol with acetyl chloride, separating the vitamin acetate from the esterification mixture and treating it to remove unreacted vitamin A alcohol.

KENNETH C. D. HICKMAN.